Nov. 2, 1965    R. BECKER    3,214,925
SYSTEM FOR GAS SEPARATION BY RECTIFICATION AT LOW TEMPERATURES
Filed Aug. 10, 1961    2 Sheets-Sheet 1

Inventor
RUDOLF BECKER
By Toulmin & Toulmin
Attorneys

Inventor
RUDOLF BECKER
By Toulmin & Toulmin
Attorneys 3,214,925
SYSTEM FOR GAS SEPARATION BY RECTIFICATION AT LOW TEMPERATURES
Rudolf Becker, Munchen-Solln, Germany, assignor to Gesellschaft für Linde's Eismaschinen Aktiengesellschaft, Wiesbaden, Germany
Filed Aug. 10, 1961, Ser. No. 130,568
Claims priority, application Germany, Aug. 13, 1960, G 30,283
6 Claims. (Cl. 62—13)

This invention relates to a method for the separation of gaseous mixtures by rectification at low temperature, particularly air separation, where at least one separation product, preferably oxygen, is raised in pressure in the liquid state by means of a pump, and said high pressure liquid is subsequently evaporated in heat exchange with a condensing feed gas and heated to the ambient temperature.

It is known in producing gaseous compressed oxygen to first evaporate the liquid product taken from the rectification column, to heat it countercurrently with air to be separated and then to compress the oxygen to the desired final pressure (German Patent 901,542). This method has the disadvantage that the oxygen must be highly compressed from atmospheric pressure with turbo or piston compressors, the lower stages of which are large and expensive, and wherein it is difficult to protect the oxygen from contamination with oil.

It is further known to first bring the liquid oxygen to the desired final pressure and to then evaporate it in heat exchange with the air to be separated (German Patent 952,908). This method avoids the disadvantages of the latter method on the one hand, but on the other hand, the air to be separated must be compressed to a very high pressure so that it condenses at the evaporation temperature of the high pressure oxygen being heat exchanged therewith.

The object of this invention, therefore, is to avoid the shortcomings of the prior art by providing a novel system for separating gases.

Upon further study of the specification and appended claims, other objects and advantages will become apparent.

These objects are attained by raising the separation product to an intermediate pressure which is below the final pressure, and then evaporating it in heat exchange with condensing feed gas, and finally compressing the separation product in the gaseous state to the finally desired pressure.

An important advantage of this method is that the energy requirement for pumping the liquid separation product to a certain pressure is lower than that for operation with gas compressors. Another advantage is the lower cost as compared with those for other installations.

Figure 1:
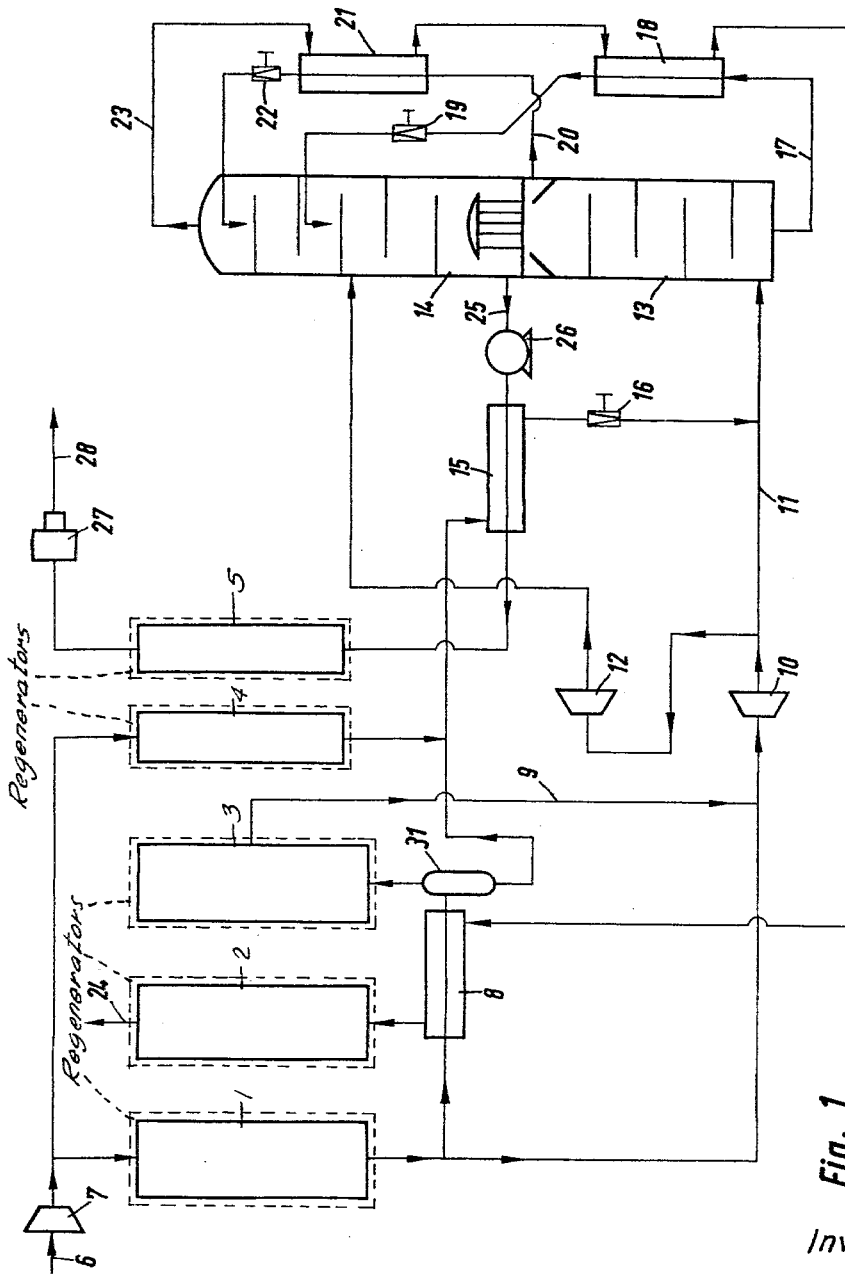
Figure 2:
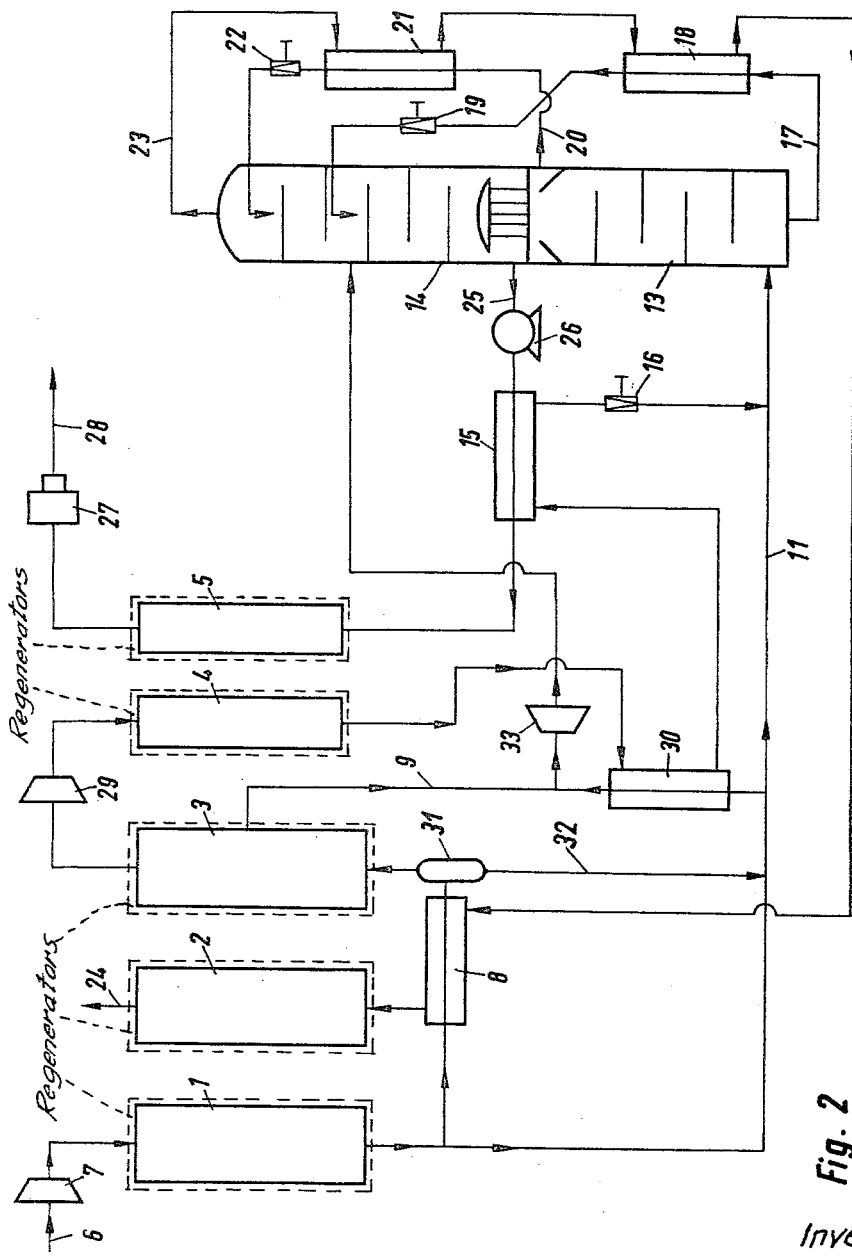

For the purposes of illustration, the attached drawings disclose two embodiments of the present invention. FIGURE 1 is a schematic flowsheet of a system wherein the crude feed gas is divided and fed in parallel into both the nitrogen and the oxygen regenerators; whereas FIGURE 2 is a similar system, wherein all the crude feed gas enters only the nitrogen regenerator in accordance with the teachings of my copending application. In these drawings, the reversal lines and valves are omitted for the purposes of clarity and simplicity; however, it is to be understood that the nitrogen regenerators 1, 2, and 3 are cyclically interchanged and that oxygen regenerators 4 and 5 are also cyclically interchanged in the conventional manner.

The invention can be used with particular advantage for the production of oxygen by air separation and will now be described in more detail by the following example. It can be used analogously for all one—or multi-stage gas separation methods where at least one separation product is to be gained under pressure.

In the case of air separation, liquid oxygen is withdrawn from the rectification column and by means of a pump is pressurized to the desired intermediate pressure. This intermediate pressure is selected so that by means of a heat exchange between the evaporating oxygen and gaseous air or nitrogen, the latter gases can be liquefied under a pressure of about 6–18 atm., which pressure is attainable by turbo compressors or screw compressors. In the simplest case, the entire quantity of air to be separated must be led to the apparatus at a somewhat high pressure than is necessary for separation. After cooling and cleaning in the main heat exchangers, preferably regenerators, a portion of this compressed air is condensed by means of countercurrent heat exchange with evaporating oxygen which has been brought in the liquid state to a corresponding pressure. The other portion of compressed air, if necessary after heating, is expanded, doing external work, and is also introduced into the rectification apparatus. With the utilization of a multi-column-rectification apparatus, this expansion work can occur in one or several stages to reach the pressure levels of the pressure column and low pressure column into which the gas is then introduced. For heating this gas which is to be expanded, known methods can be used. It is particularly advantageous to send part of the feed gas which is cooled and completely cleaned in the regenerator, in a reverse direction through at least a section of a regenerator cleaned in the previous cycle and to mix the gas heated thereby, prior to the work-performing expansion, with the cleaned cold gas stream.

According to another modification of this invention it is possible to pass the feed gas to the apparatus under the normal separation pressure and to compress only a portion of said gas to the pressure of condensation in heat exchange with the liquid oxygen.

For the purpose of producing particularly pure oxygen it is possible to lead all of the impure feed air through the nitrogen regenerator and to clean it there completely. Thereafter, a portion thereof is led again in reverse direction through an already cleaned nitrogen regenerator and heated to the ambient temperature before it is again cooled to the separation temperature in an oxygen regenerator. According to a particularly preferred embodiment of the inventive idea, this partial stream is compressed, after being heated to the ambient temperature, to an intermediate pressure necessary for evaporation of the oxygen, then cooled in the oxygen regenerator and, if necessary, further heat exchangers, before it is condensed in heat exchange with evaporating oxygen and expanded into the pressure column of the rectification apparatus. The oxygen regenerators then receive dry air, and therefore need only to be about one-half of the normal size. Thereby, the contamination of the oxygen is low upon switching. This effect becomes more favorable when for the heat exchange oxygen-air, greater temperature differences are acceptable. This is possible because the sublimation condition need not be considered.

With respect to the separation of liquid oxygen according to this invention, the liquid oxygen leaving the rectification column is at a pressure of about 1.4 atmospheres absolute (in the following abbreviated "atm."), and a temperature of about 93° K. The liquid is then pumped to a pressure of about 2 to 8 atm., preferably 2.4 to 5 atm., before it is evaporated in heat exchange relationship with feed for the rectification column. Finally, the evaporated gaseous oxygen is compressed to a finally desired pressure of 12 to 40 atm., preferably 15 to 30 atm.

Referring to the embodiments illustrated in the drawings, in FIGURE 1, the air to be separated is introduced through conduit 6, is compressed to about 7 atm., in compressor 7, is passed through regenerators 1 and 4, is cooled therein and freed from carbon dioxide and water. A portion of the air is diverted after regenerator 1, and is further cooled in heat exchanger 8, thereby being partly liquefied and subsequently separated in separator 31 into a liquid and gaseous phase. The gaseous phase is at least partly heated in the lower part of the regenerator 3 and withdraw through conduit 9 at an intermediate position. This warm air stream is united with the cold partial stream coming directly from regenerator 1, is led to turbine 10 and there expanded to a pressure of about 5.5 atm. Part of the expanded air is led through conduit 11 directly into pressure column 13 of a two-stage rectification system; whereas the other part of the expanded air is further expanded in turbine 12 to about 1.3 atm., and led into low pressure column 14.

The liquid phase and, if desired, a portion of the gaseous phase is withdrawn from the lower part of separator 31, and united with the air which was cooled and cleaned in regenerator 4. This mixture is introduced into heat exchanger 15, wherein the gaseous portion is at least partly condensed by heat exchange with the evaporating oxygen and then expanded through valve 16 into pressure column 13.

Through conduit 17, oxygen-enriched liquid is withdrawn from the pressure column, is cooled in the heat exchanger 18 and expanded through valve 19 into low pressure column 14. By way of conduit 20 liquid nitrogen is taken from the pressure column, is supercooled in the heat exchanger 21 and after expansion through valve 22 is introduced into the head of column 14 as reflux. Gaseous nitrogen leaves the column through conduit 23 and is successively heated in heat exchangers 21, 18 and 8 and in regenerator 2 before leaving the installation through conduit 24.

From the sump of the column 14 liquid oxygen is withdrawn through conduit 25 and compressed by pump 26 to about 2.4 atm. It is subsequently evaporated in heat exchanger 15, heated in regenerator 5 to the ambient temperature, and then compressed by compressor 27 to the desired final pressure. Gaseous high pressure oxygen is then removed from the system through conduit 28.

In the embodiment according to FIGURE 2, all the air which was introduced at about 5.7 atm., is led through regenerator 1, cooled therein and cleaned. A portion thereof is further cooled in heat exchanger 8, thereby partly liquefied and led into separator 31. The liquid portion is led through conduit 32 into conduit 11 which leads to pressure column 13; the gaseous portion is led in reverse direction into the regenerator 3. A part of this gas stream is taken off by way of conduit 9; whereas, the other part is heated to the ambient temperature of the regenerator, is compressed by compressor 29 to about 10 atm., and then cooled again in regenerator 4. The gas is then further cooled in heat exchanger 30, is thereby partly liquefied and then brought into countercurrent heat exchange with oxygen of about 3.8 atm., in heat exchanger 15. The oxygen evaporates and thereby liquefies more air which is expanded through valve 16 into pressure column 13.

This latter method has the advantage that only cleaned air is led through the oxygen regenerators and a very pure final product is thereby obtained. Because the air is compressed to 10 atm., the intermediate pressure at which the liquid oxygen is evaporated can be higher than in the process illustrated in FIGURE 1. The production of refrigerant values occurs through expansion work in turbine 33 of the warm gas stream taken off at an intermediate point of the regenerator 3 in conjunction with a portion of the main stream which is diverted from conduit 11 and is heated in heat exchanger 30.

By virtue of the present invention it is possible to avoid the expense of high capacity turbo or piston compressors necessary for practicing the method disclosed in German Patent 952,908. As a basis of comparison of the investment costs between the patented method and the method of this invention, the compressor of the patented method is about 1.15 times as costly as the liquid pump [1] utilized in the present invention. Furthermore, the oily contaminants of the products of the patented process are also avoided in the present invention. Likewise, the instant invention is significantly superior to the process of German Patent 952,908 as again, this invention avoids excessive energy and investment costs associated with compressing large quantities of air to a very high pressure. Consequently, it is apparent that this invention offers purer and more inexpensive products than the prior art in addition to significantly reducing investment capital for the required apparatus. Thus, particularly in view of the nature of the tonnage oxygen industry, where even seemingly trivial improvements are economically important, it is apparent that the present invention contributes significantly to the advance of the art.

From the foregoing description, it is apparent that one skilled in the art can appreciate the essential characteristics of this invention, and without departing from the spirit and scope thereof, can modify and adapt this invention to various usages and conditions. For example, in the described method, the evaporation of oxygen is caused by condensed air, but in the same manner it is also possible to utilize nitrogen instead of air. Thus, such adaptations and modifications should, and are intended to be within the range of equivalents of the following claims.

What I claim is:

1. In a process for separating a gaseous feed mixture into its separation products by low temperature rectification, wherein a separation product is recovered from the rectifying zone in the liquid phase and said product is compressed to a predetermined higher final pressure, the improvement which comprises compressing, cooling and cleaning said gaseous feed; heating to ambient temperature and further compressing at least a part of said gaseous feed mixture to a pressure between 6 and 18 atmospheres; pumping said liquid product from said rectification zone to an intermediate pressure below said predetermined final pressure to obtain an intermediate-pressure liquid; passing said intermediate-pressure liquid in heat exchange relation with at least a part of said gaseous feed mixture which has previously been compressed and cooled; said intermediate pressure being such as to cause the said intermediate-pressure liquid to be under-critically evaporated during said heat exchange and said part of said gaseous feed mixture being at such pressure and temperature prior to said heat exchange as to at least partially condense during said heat exchange; and then compressing said evaporated intermediate-pressure product in the gaseous state to the said predetermined higher final pressure.

2. The process of claim 1, wherein the said gaseous feed mixture is air, and the said separation product is oxygen.

3. The process of claim 2 wherein the oxygen leaving the rectification zone is at a pressure of about 1.4 atmospheres absolute, the intermediate-pressure of vaporizing liquid oxygen is about 2–8 atmospheres absolute, and the predetermined higher final oxygen pressure is about 12–40 atmospheres absolute.

4. In a process for separating air into its separation products by low temperature rectification, wherein liquid oxygen is recovered from the rectifying zone and said liquid oxygen is compressed to a predetermined higher final pressure, the improvement comprising:

---

[1] Including oxygen compressor.

(a) first normally compressing, cooling and cleaning said air;
(b) heating to ambient temperature and further compressing at least a portion of said air to a pressure between 6 and 18 atmospheres;
(c) pumping said liquid oxygen from said rectification zone to an intermediate pressure below said predetermined final pressure and obtaining an intermediate-pressure liquid oxygen;
(d) passing said intermediate-pressure liquid oxygen in heat exchange relation with said portion of said air of (b), said intermediate pressure forming undercritically evaporated oxygen from said intermediate-pressure liquid oxygen during said heat exchange and said pressure between 6 and 18 atmospheres of (b) causing at least partial condensation of said air during said heat exchange; and
(e) compressing said undercritically evaporated oxygen to said predetermined higher final pressure.

5. The process of claim 4 wherein the oxygen leaving the rectification zone is at a pressure of about 1.4 atmospheres absolute, the intermediate-pressure of vaporizing liquid oxygen is about 2–8 atmospheres absolute, and the predetermined higher final oxygen pressure is about 12–40 atmospheres absolute.

6. Apparatus for the low temperature rectification of a gas mixture into its respective parts comprising: a rectification column having a sump for collecting a liquid separation product of said mixture, a pump having a high pressure side at an intermediate pressure and also having a low pressure side, a first conduit connecting said sump to the low pressure side of said pump, a heat exchanger having a liquid inlet and a gas outlet in series and also having a gas inlet and a liquid outlet in series, a third conduit connecting said high pressure side of said pump with said liquid inlet of said heat exchanger to supply said liquid separation product thereto at said intermediate pressure, a set of two regenerators having a cold end and a warm end, a fourth conduit connecting said gas outlet of said heat exchanger to the cold end of one of said regenerators, a gas compressor having a low pressure side and a high pressure side, a fifth conduit connecting said warm end of one of said regenerators to the low pressure side of said compressor, said compressor delivering said product at a predetermined higher pressure, means for supplying a gas at least partly by way of the other of said two regenerators to said gas inlet of said heat exchanger at a temperature and pressure in the range of 6 to 18 atmospheres such that the gas will at least partially condense during passage through the said heat exchanger to the said liquid outlet thereof, a further set of three regenerators, each of which has a cold end and a warm end, and a second compressor having a low pressure side and a high pressure side, said warm end of one of three regenerators being connected to the low pressure side of said second compressor, the high pressure side of said second compressor being connected to the warm end of the other of said first set of two regenerators, and the cold end of the latter regenerator being connected to the gas inlet of said heat exchanger and constituting the means for supplying said gas to said gas inlet.

References Cited by the Examiner
UNITED STATES PATENTS

| | | | |
|---|---|---|---|
| 2,700,282 | 6/55 | Roberts | 62—41 X |
| 2,708,831 | 5/55 | Wilkinson | 62—41 X |
| 2,712,738 | 7/55 | Wucherer | 62—13 X |
| 2,822,675 | 2/58 | Grenier | 62—41 X |
| 2,861,432 | 11/58 | Haselden | 62—41 X |
| 2,873,583 | 2/59 | Potts | 62—25 X |
| 2,915,882 | 12/59 | Schuftan | 62—41 X |
| 2,918,802 | 12/59 | Grunberg | 62—41 X |
| 2,968,160 | 1/61 | Schilling | 62—41 X |
| 3,059,439 | 10/62 | First | 62—41 X |
| 3,083,544 | 4/63 | Jakob. | |

FOREIGN PATENTS 1,065,867  1/61  Germany.

NORMAN YUDKOFF, *Primary Examiner.*
ROBERT A. O'LEARY, *Examiner.*